United States Patent
Snyder, Jr.

[15] 3,649,052
[45] Mar. 14, 1972

[54] BAYONETTE LOCK COUPLING

[72] Inventor: Clifford H. Snyder, Jr., 173 Rosemont Drive, Coraopolis, Pa. 15108

[22] Filed: June 3, 1970

[21] Appl. No.: 42,937

[52] U.S. Cl. ................................285/38, 285/279, 285/351, 285/362
[51] Int. Cl. .........................................................F16l 35/00
[58] Field of Search....................285/86, 279, 351, 361, 362, 285/376, 377, 396, 402, 381, 38

[56] References Cited

UNITED STATES PATENTS

| | | | |
|---|---|---|---|
| 2,305,841 | 12/1942 | Carlson | 285/377 X |
| 2,413,730 | 1/1947 | Somiron | 285/351 X |
| 1,020,258 | 3/1912 | Bundy | 285/402 X |
| 2,047,714 | 7/1936 | Smith | 285/402 X |
| 3,455,580 | 7/1964 | Howard | 285/396 |

FOREIGN PATENTS OR APPLICATIONS

| 1,526,167 | 4/1968 | France | 285/86 |

*Primary Examiner*—Dave W. Arola
*Attorney*—George Raynovich, Jr.

[57] ABSTRACT

A full swiveling coupling which is locked by means of a bayonette lock on a collar is provided. The bayonette lock permits coupling of the housing and the nipple by a simple fractional turn of the collar over the nipple. A radial seal is provided between the nipple and the housing. The collar which holds a portion of the bayonette coupling device is spring biased to facilitate locking.

3 Claims, 3 Drawing Figures

Patented March 14, 1972

INVENTOR.
CLIFFORD H. SNYDER, JR.
BY
ATTORNEY

BAYONETTE LOCK COUPLING

BACKGROUND OF THE INVENTION

Many piping applications require a positive lock coupling which may be readily locked by small movement of the coupling parts. The present invention is directed to a coupling which has a positive bayonette lock locking the coupling halves together. The bayonette lock may be engaged by a mere fractional turn of the collar of the coupling over the nipple of the coupling.

At the same time, the present invention provides a coupling in which the two halves of the coupling may rotate relative to each other and in which the position of the lock mechanism may be radially changed to accommodate the position at which the two coupling halves are placed together.

SUMMARY

The present invention provides a coupling having a bayonette lock, radial seals to sealingly engage the nipple to the housing, and spring biasing means to maintain the bayonette lock in the lock position. The coupling is a positive lock coupling which may be readily engaged or disengaged by a fractional turn of a collar on the coupling.

With the foregoing considerations in mind, it is an object of the present invention to provide an improved positive lock coupling.

Another object of the present invention is to provide a positive lock coupling which permits rotation of the two halves of the coupling relative to each other.

These and other objects of the present invention will become apparent as this description proceeds in conjunction with the accompanying drawings.

DESCRIPTION OF THE PREFERRED EMBODIMENT

Figure 1:
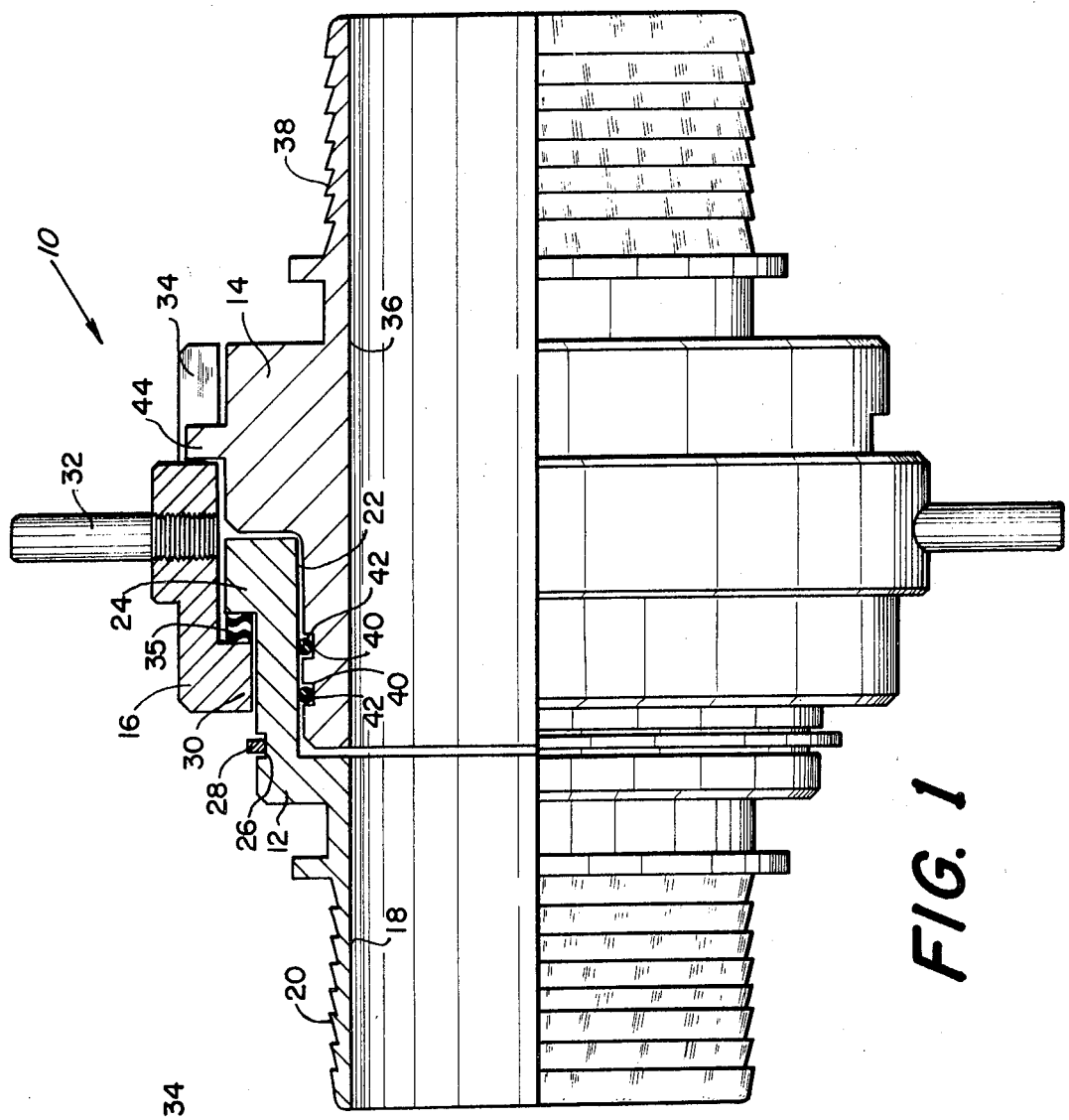
FIG. 1 shows a partial sectional view of the coupling of the present invention in the engaged position.

Referring to the drawings, there is shown a coupling 10 having a generally cylindrical housing 12 and generally cylindrical nipple 14.

A collar 16 is rotatably positioned over the housing 12. The collar 16 carries a portion of the bayonette locking mechanism as will hereafter be described.

The housing 12 has a cylindrical fluid passage 18 formed therethrough. Conduit connections 20 are formed on the outside of housing 12 to readily connect the housing to a fluid conduit. The fluid passage 18 is enlarged to form a cylindrical nipple receiving passage 22 at the end of housing 12. The exterior portion of the housing 12 on the end adjacent to nipple receiving passage 22 has a radially extending flange 24 formed thereon.

Formed on the exterior of housing 12 is a groove 26 which receives a snap ring 28. Snap ring 28 serves to axially retain the collar 16 on the housing 12.

Figure 3:
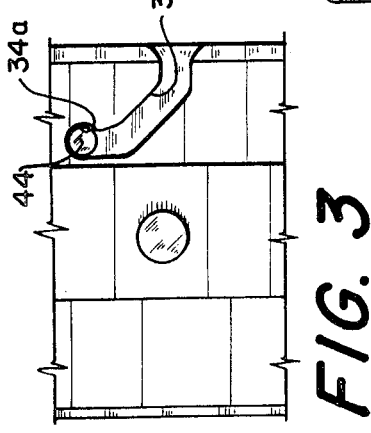
FIG. 3 shows a fragmented detail drawing of the bayonette lock arrangement of the present invention.
Figure 2:
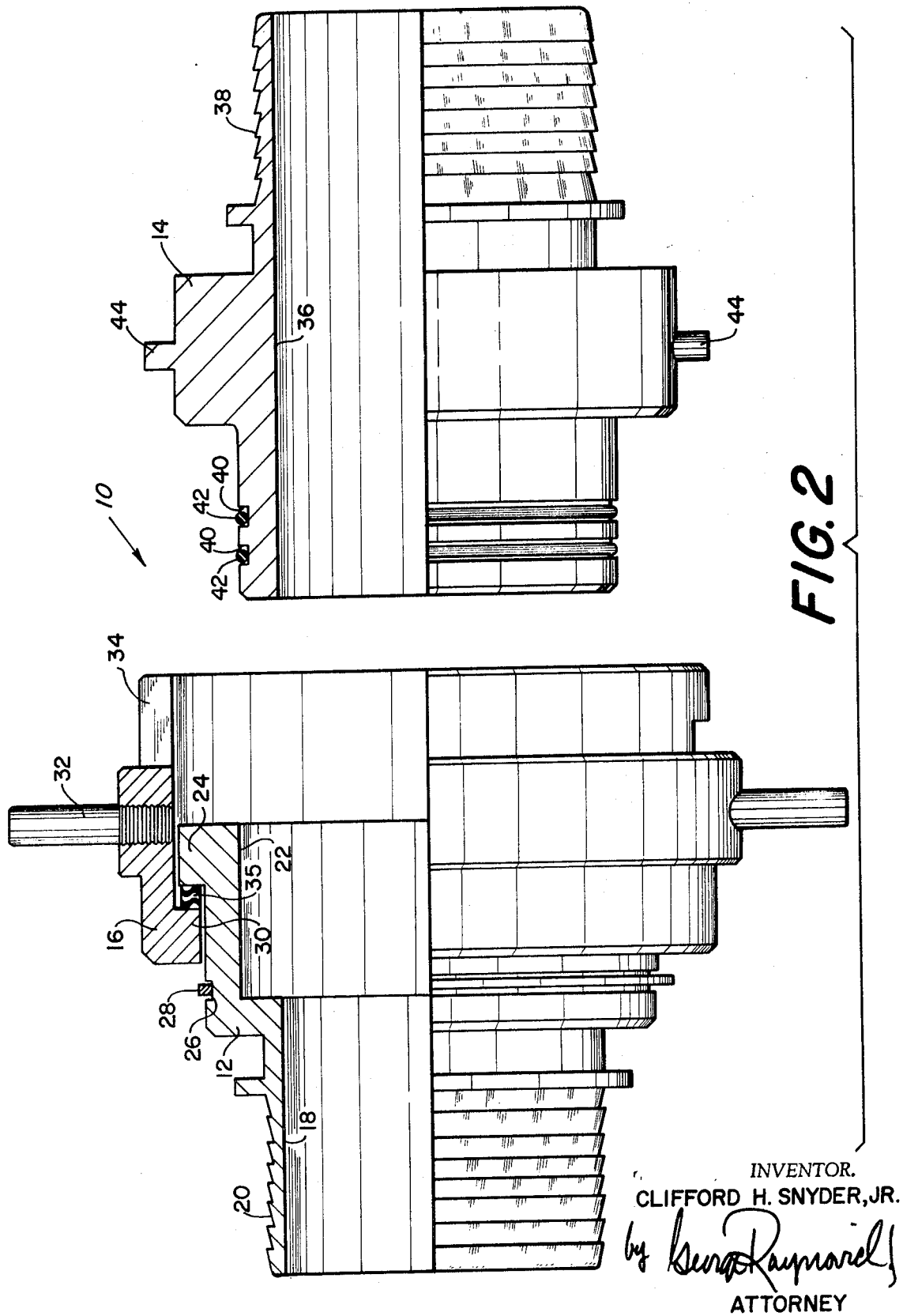
FIG. 2 shows the coupling of the present invention in the disengaged position.

The collar 16 has an inwardly extending radial flange 30 formed thereon. The collar 16 also has two handles 32 fixed thereto for the purpose of rotating the collar 16 about housing 12. Detent passages 34, best shown in FIG. 3, are formed on collar 16 to receive detent pins to form the bayonette lock as will hereinafter be more clearly explained. The detent passages 34 each have a detent lock portion 34a which cooperates with the lock pins in a manner to be described.

Wave washer springs 35 are positioned between the inwardly extended flange 30 of collar 16 and the outwardly extending flange 24 of housing 12 so that the collar 16 is spring biased axially away from the flange 24 on housing 12.

The nipple 14 has a fluid passage 36 formed therethrough. Nipple 14 also has conduit connections 38 formed on the exterior thereof to facilitate connection of the nipple to a fluid conduit.

At the other end, nipple 14 has annular grooves 40 formed therein to receive O-rings 42. The O-rings 42 form a seal means between the nipple 14 and the housing 12 when the coupling is in the engaged position as shown in FIG. 1. The nipple 14 has radially extending detent pins 44 formed thereon.

When it is desired to engage the nipple 14 to the housing 12 of coupling 10, the collar 16 is rotated until the mouth of detent passages 34 are aligned with the detent pins 44. The nipple 14 is then inserted into the housing 12 so that the O-rings 42 engage the cylindrical internal surface of nipple receiving passage 22 thereby forming a seal.

When the nipple 14 is positioned within the housing 12, the collar 16 is rotated relative to the nipple 14. The rotation of collar 16 causes the nipple to be drawn toward the housing 12 since the detent passages 34 perform a camming action on the detent pins 44 and draw the nipple closer to the housing 12. When the collar is rotated until the detent pins 44 assume the position shown in FIG. 3 relative to the detent passages 34, the coupling is locked. The wave washer springs 35, the force of which is overcome while the coupling is being locked, urge the collar 16 axially away from the nipple 14 so that the detent pins 44 come to rest in the depressions 34a which from the lock portion of passages 34. It then requires additional force to unlock the bayonette coupling since the initial unlocking rotation of collar 16 is against the force of the wave washer springs 35.

The coupling of the present invention permits rotation of the housing 12 relative to the nipple 14. The collar 16 rotates as a unit with the nipple 14 relative to housing 12. The bayonette lock provides a quick, simple positive lock for the coupling.

According to the provisions of the Patent Statute, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. A coupling for sealingly connecting two conduits into fluid communication comprising:
   a. a housing having a cylindrical fluid passage therethrough;
   b. A collar rotatably circumposed on said housing, said collar having radially offset detent-receiving means thereon;
   c. a nipple having a cylindrical fluid passage therethrough and including seal means on the outer cylindrical surface thereof, said nipple having detent pins protruding radially therefrom;
   d. bayonette lock means formed by said nipple detent pins and said detent-receiving means on said housing collar whereby a said coupling housing nipple may be sealingly locked into fluid communication with a fractional turn of said collar relative to said housing and said nipple, said collar including an inwardly directed annular flange, said housing including an outwardly directed annular flange in opposed, axially spaced relation to the flange of said collar;
   e. spring means trapped within said collar and interposed between said annular flanges and normally urging said the collar axially away from said nipple and toward an "open" position, said spring means comprising at least one wave washer circumposed about said housing whereby axial pressure tends to frictionally maintain the bayonet lock means "closed" after the collar is rotated into "locked" relation onto said detent pins; and
   f. lock ring means circumposed about said housing and retained in a groove portion therein in spaced relation from said housing annular flange for limiting axial movement of said collar on said housing and preventing axial removal of said collar off said housing, said housing fluid passage having an enlarged nipple receiving on the end thereof to sealingly receive said nipple, said collar and said nipple being rotatable as a unit relative to said housing when said coupling is engaged, said seal means comprising a radial seal between the adjacent exterior and interior surfaces of said nipple and housing respectively, said seal means comprising adjacent O-rings positioned in grooves in the exterior surface of said nipple, said housing and said nipple being rotatable at any radial angle through 360° relative to each other while still being coupled.

2. The structure as claimed in claim 1 in which said collar includes radially extending handles for facilitating the fractional rotation of said collar for coupling or decoupling the nipple and housing against the axial force of said wave washer.

3. The structure as claimed in claim 1 in which said annular flange of said housing and an enlarged diameter portion of said nipple having the detent pins extending therefrom are of substantially the same diameter and are abuttingly engaged when said parts are coupled.

* * * * *